(12) United States Patent
Yagi et al.

(10) Patent No.: US 6,892,165 B2
(45) Date of Patent: May 10, 2005

(54) DIAGNOSIS METHOD AND DIAGNOSIS APPARATUS OF PHOTOVOLTAIC POWER SYSTEM

(75) Inventors: Yasuhiro Yagi, Yawata (JP); Kunimoto Ninomiya, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 148 days.

(21) Appl. No.: 09/800,515

(22) Filed: Mar. 8, 2001

(65) Prior Publication Data

US 2002/0059035 A1 May 16, 2002

(30) Foreign Application Priority Data

| Feb. 8, 1991 | (JP) | ........................................ | 2001-032310 |
| Mar. 10, 2000 | (JP) | ........................................ | 2000-067635 |

(51) Int. Cl.[7] .......................... G06F 11/30; G21C 17/00
(52) U.S. Cl. .......................... 702/183; 702/59; 702/63; 320/101; 136/290
(58) Field of Search .................. 702/57–61, 63–65, 702/108, 182–185, 187; 320/101, 136; 324/522; 136/240; 186/290

(56) References Cited

U.S. PATENT DOCUMENTS

| 4,571,532 | A | * | 2/1986 | Jaster ........................ 320/101 |
| 4,636,931 | A | * | 1/1987 | Takahashi et al. ............ 363/71 |
| 4,649,334 | A | * | 3/1987 | Nakajima .................... 323/299 |
| 4,755,942 | A | * | 7/1988 | Gardner et al. ............. 700/284 |
| 5,302,902 | A | * | 4/1994 | Groehl ....................... 324/434 |
| 5,594,313 | A | * | 1/1997 | Takeda ....................... 320/166 |
| 5,669,987 | A | * | 9/1997 | Takehara et al. ............ 136/244 |
| 6,119,047 | A | * | 9/2000 | Eryurek et al. .............. 700/28 |
| 6,278,052 | B1 | * | 8/2001 | Takehara et al. ............ 136/244 |
| 6,512,458 | B1 | * | 1/2003 | Kobayashi et al. .......... 340/635 |

FOREIGN PATENT DOCUMENTS

| FR | 2439392 | A | * | 6/1980 | .............. F24J/3/02 |
| FR | 2445955 | A | * | 9/1980 | .............. F24J/3/02 |
| JP | 62100819 | A | * | 5/1987 | .............. G05F/1/67 |
| JP | 01135078 | A | * | 5/1989 | .......... H01L/31/04 |
| JP | 10091259 | A | * | 4/1998 | .............. G05F/1/67 |
| JP | 2000022192 | A | * | 1/2000 | ......... H01L/31/042 |
| JP | 2000040838 | A | * | 2/2000 | .......... H01L/31/04 |

OTHER PUBLICATIONS

English Translation of JP 2000022192 A cited above.*
English Translation of JP 2000022192 A cited above.*
Begovic, M. et al., Monitoring and data Acquisition for a large Roof–Mounted Photovoltaic Array, Apr. 12–14, 1997, IEEE, Proceedings IEEE Southeastcon '97. 'Engineering the New Century' pp. 298–300.*
English Translation of JP 2000022192 A cited above.*
Begovic, M. et al., Monitoring and data Acquisition for a large Roof–Mounted Photovoltaic Array, Apr. 12–14, 1997, IEEE, Proceedings IEEE Southeastcon '97. 'Engineering the New Century' pp. 298–300.*

* cited by examiner

*Primary Examiner*—Patrick Assouad
*Assistant Examiner*—Manuel L Barbee
(74) *Attorney, Agent, or Firm*—Armstrong, Kratz, Quintos, Hanson & Brooks, LLP

(57) ABSTRACT

A reference output characteristic of a photovoltaic power system at the time of normal operation is obtained in accordance with an installation condition (topography of installation site, meteorological condition, configuration of the system itself, or the like) of the photovoltaic power system, an output characteristic in the photovoltaic power system during operation is actually measured, the obtained reference output characteristic and the measured output characteristic are compared and, based on the comparison result, the normality/abnormality of the output is diagnosed and, at the same time, the cause is diagnosed in the case of abnormality. The reference output characteristic at the time of normal operation can also be obtained based on the measured value of the past output characteristic.

27 Claims, 12 Drawing Sheets

DIAGNOSIS METHOD AND DIAGNOSIS APPARATUS OF PHOTOVOLTAIC POWER SYSTEM

BACKGROUND OF THE INVENTION

1. Field of the Invention

The present invention relates to a method and an apparatus for diagnosing a photovoltaic power system provided in a house, or the like and, in particular to a diagnosis method and a diagnosis apparatus of a photovoltaic power system which diagnoses the normality/abnormality of the output and which, if necessary, diagnoses the cause of the abnormality.

2. Description of the Related Art

Conventionally, photovoltaic power, which has very little effect on the earth's environment and which generates electricity through the use of solar energy has been considered the most promising clean energy for the future, unlike thermal power generation in which fossil fuels undergo combustion and in which large amounts of carbon dioxide are discharged leading to global warming, hydroelectric power generation which has the difficulty of securing installation sites or atomic power generation which has the problem of the disposal of waste, or the like. In recent years, the spread to residential houses of the photovoltaic power system has expanded in accordance with the introduction of financial assistance from public organizations.

Such a photovoltaic power system comprises a solar battery panel, having a plurality of solar battery cells electrically connected in series, which is mounted on a roof, or the like; an inverter, which converts the direct current output from the solar battery panel to an alternating current output; and wires, which make connections between the solar battery panel and the inverter as well as between the inverter and the loads. Then, when the solar rays irradiate the solar battery panel, a photovoltaic conversion is carried out in each solar battery cell and these conversion outputs are collected so as to generate direct current power and, then, this direct current power is converted to alternating current power by the inverter so as to be supplied to the loads.

In order to stably gain a desired electric energy to be supplied to the loads, it is necessary to monitor whether or not the photovoltaic power system operates normally so as to take measures after quickly discovering the cause in the case that it is found that the output is abnormal. However, a system wherein the diagnosis, of whether or not the operation of the photovoltaic power system is normal, is carried out simply and with a high precision has not yet been constructed. Though a variety of methods for detecting abnormalities of each component of a solar power system have been conventionally known, there is a problem that, in the case that the output of the photovoltaic power system is abnormal, the work of the discovery of the cause by inspecting each component using such methods takes a long period of time. In addition, there is a problem in that the work of the discovery of the cause cannot be carried out in the case that the output of the system becomes abnormal in spite of the fact that each component operates normally.

SUMMARY OF THE INVENTION

One object of the present invention is to provide a diagnosis method and a diagnosis apparatus of photovoltaic power system which can easily and precisely diagnose the normality/abnormality of the output of the photovoltaic power system.

Another object of the present invention is to provide a diagnosis method and a diagnosis apparatus of photovoltaic power system which can not only diagnose the normality/abnormality of the output but can also quickly diagnose the cause of the abnormality.

Still another object of the present invention is to provide a diagnosis method and a diagnosis apparatus of photovoltaic power system which can easily diagnose a cause other than the abnormality of the components.

In a diagnosis method and apparatus according to the first aspect of the invention, a reference output characteristic at the time of normal operation that is obtained in accordance with the installation condition and an output characteristic obtained during actual operation are compared and the comparison result is evaluated to diagnose the normality/abnormality of the output of the photovoltaic power system. Therefore, a precise diagnosis result can be quickly obtained.

In a diagnosis method and apparatus according to a second aspect of the invention, the reference output characteristic at the time of normal operation is calculated in accordance with the installation condition and the calculated reference output characteristic and the output characteristic which has actually been measured are compared and the comparison result is evaluated in order to diagnose the normality/abnormality of the output of the photovoltaic power system. Accordingly, the reference output characteristic is calculated in accordance with the installation condition and, therefore, it is not necessary to store, in a memory, a large number of reference output characteristics in accordance with a variety of installation conditions so as to be able to correspond to all installation conditions.

According to a third aspect of the invention, as for the installation condition of the photovoltaic power system according to the first or the second aspect of the invention, site (longitude, latitude, topography, meteorological condition, or the like), direction (16 directions), angle (inclination angle with respect to the ground), configuration (types of solar batteries, number of cells in series, total area of cells (panel area)) are used. Accordingly, precise data of the reference output characteristic can be obtained and, together with that, the diagnosis result becomes precise.

According to a fourth aspect of the present invention, the output characteristic measured in the first or second aspect of the invention is stored in a memory. Accordingly, a diagnosis process can be carried out at an arbitrary point of time.

In a diagnosis method and apparatus according to a fifth aspect of the invention, a past output characteristic is preserved and this output characteristic is taken into consideration in diagnosing the normality/abnormality of the photovoltaic power system. Accordingly, a precise diagnosis result can be quickly obtained by taking into consideration the effect of the characteristic particular to the photovoltaic power system to be diagnosed.

In a diagnosis method and apparatus according to a sixth aspect of the invention, the reference output characteristic at the time of normal operation is obtained in accordance with the past output characteristic and the obtained reference output characteristic and the output characteristic which has actually been measured are compared so that the comparison result is taken into consideration so as to diagnose the normality/abnormality of the output of the photovoltaic power system. Accordingly, the reference output characteristic is obtained in accordance with the actual output characteristic of the past and, therefore, the optimal reference output characteristic suitable for each photovoltaic power system can be easily obtained so as to quickly obtain a precise diagnosis result.

According to a seventh aspect of the invention, the reference output characteristic is made to be different for each of a plurality of time periods, gained by dividing up a year in the sixth aspect of the invention. The output characteristic in a photovoltaic power system is easily influenced by seasonal changes in the meteorological condition (air temperature, solar radiation time, sun altitude, or the like). Therefore, a standard output characteristic suitable for the meteorological condition is set for each of a plurality of time periods (monthly unit, seasonal unit, or the like) in a year. Accordingly, the reference output characteristic which is always optimal throughout the year can be obtained so as to quickly obtain a precise diagnosis result.

In an eighth aspect of the invention, only the output characteristic at the time of the normal case, as a result of a diagnosis in the sixth or the seventh aspect of the invention, is reflected in the reference output characteristic for the next time. Accordingly, the output characteristic of the abnormal case is not reflected in the reference output characteristic for the next time and, therefore, a reference output characteristic with a high precision can always be obtained.

In a diagnosis method and apparatus according to a ninth aspect of the invention, the reference output characteristic used for the diagnosis of the normality/abnormality of the first photovoltaic power system of to be diagnosed is obtained in accordance with the output characteristic of the second photovoltaic power system. Accordingly, even in the first photovoltaic power system which is newly set, the reference output characteristic thereof is obtained by considering the output characteristic of the second photovoltaic power system during actual operation which has a similar installation condition and system characteristic and, therefore, a precise reference output characteristic can easily be obtained.

In a diagnosis method and apparatus according to a tenth aspect of the invention, the comparison result of comparing the reference output characteristic at the time of normal operation with the output characteristic during actual operation, in the first to the ninth aspects of the invention, is considered so as to diagnose the cause of the case where the output is abnormal. Accordingly, the cause of the abnormality can be quickly discovered so as to take immediate measures.

In a diagnosis method and apparatus according to an eleventh aspect of the invention, as for the reference output characteristic and the output characteristic in the first to the tenth aspects of the invention, a direct current voltage, an alternating current voltage, a direct current electric energy, an alternating current electric energy, or the like, are used. Accordingly, a diagnosis can be carried out from multiple points of view and not only the cause resulting from the abnormality of a component but also other causes can be diagnosed.

In a diagnosis method and apparatus according to a twelfth aspect of the invention, the actual amount of solar radiation during the operation of the photovoltaic power system is measured. Accordingly, data of the amount of solar radiation can be acquired as the data for diagnosis so as to carry out a diagnosis from a greater number of multiple points of view.

The above and further objects and features of the invention will more fully be apparent from the following detailed description with accompanying drawings.

DETAILED DESCRIPTION OF THE PREFERRED EMBODIMENT OF THE PRESENT INVENTION

Figure 1:
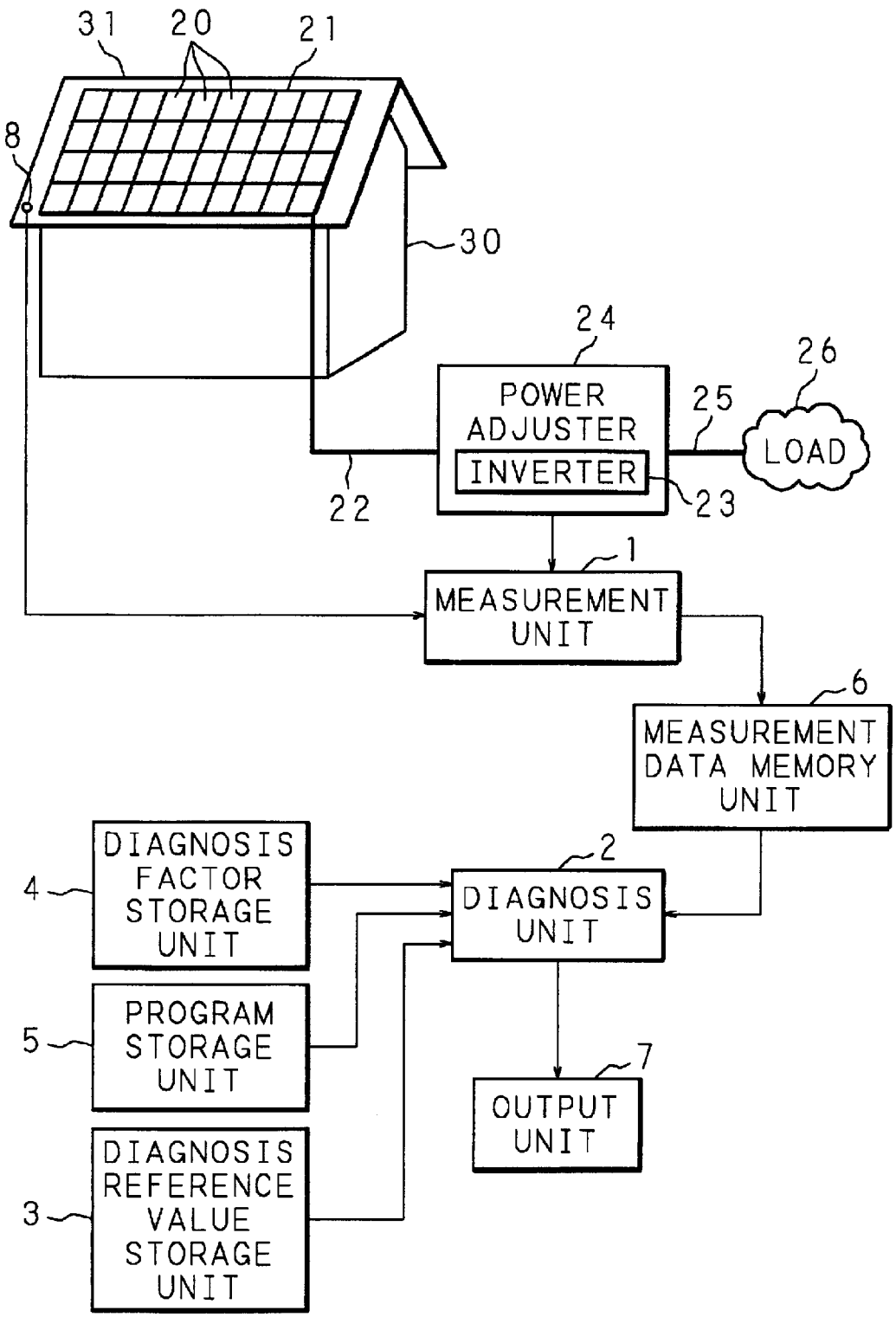
FIG. 1 is a schematic diagram showing a first embodiment of the present invention in which a diagnosis of a photovoltaic power system is carried out by using a diagnosis apparatus of photovoltaic power system.

In the following, the present invention is described based on the drawing showing the preferred embodiments.

First Embodiment

FIG. 1 is a schematic diagram showing the first embodiment in which a diagnosis of a photovoltaic power system is carried out by using a diagnosis apparatus of photovoltaic power system according to the present invention.

A solar battery panel 21 which has a plurality of solar battery cells 20 electrically connected in series is attached to the roof 31 of a house 30 at a predetermined angle with respect to the ground surface. A wire 22 for taking out the output of the solar battery panel 21 is connected to a power adjuster 24 which has an inverter 23 for converting a direct current output to an alternating current output. In addition, a wire 25 for the output from the power adjuster 24 is connected to a load 26, comprising a variety of electric appliances.

When solar rays irradiate the solar battery panel 21, photovoltaic conversion is carried out in each of the solar battery cells 20 and these conversion outputs are collected so as to generate a direct current power which is converted into an alternating current power by an inverter 23 so that the converted alternating current power is supplied to the load 26.

The diagnosis apparatus of photovoltaic power system according to the first embodiment has a measurement unit 1, a diagnosis unit 2, a diagnosis reference value storage unit 3, a diagnosis factor storage unit 4, a program storage unit 5, a measurement data memory unit 6, an output unit 7 and a pyrheliometer 8.

The measurement unit 1 measures the value of the output characteristic of the photovoltaic power system during operation. More specifically, the measurement unit 1 chronographically measures the value of the output characteristic (direct current voltage, direct current) before the conversion by the inverter 23 and the output characteristic (alternating current voltage, alternating current, electric power, electric energy) after the conversion. In addition, the measurement unit 1 measures the amount of solar radiation detected by the pyrheliometer 8 installed on the roof 31. Those measured values are stored in the measurement data memory unit 6. Here, each of these measured values is averaged during one segment of one hour so as to be stored in the measurement data memory unit 6. In addition, an abnormal signal of the inverter outputted from the inverter 23 whenever an abnormality occurs in the inverter 23 is also stored in the measurement data memory unit 6.

The diagnosis reference value storage unit 3 stores diagnosis reference values as a plurality of reference output characteristics obtained in advance in accordance with a variety of installation conditions of the photovoltaic power system. Parameters for these reference output characteristics are the same types of parameters of the characteristic measured in the measurement unit 1 which are stored in the measurement data memory unit 6. In addition, as for the installation condition of the photovoltaic power system at this time, the installation site (longitude, latitude, topography, meteorological condition, or the like), the installation direction (16 directions), the installation angle (inclination angle with respect to the ground surface), the configuration (types of solar batteries, number of cells in series, total area of cells (panel area)), and the like, are used.

The diagnosis factor storage unit 4 stores a diagnosis factor used at the time of diagnosis of the normality/abnormality and diagnosis of the cause of the abnormality in the photovoltaic power system. The program storage unit 5 stores an operation program for carrying out these diagnosis processes.

The diagnosis unit 2 reads out the actual characteristic (measured value) gained by the measurement unit 1 from the measurement data memory unit 6 in accordance with the operation program stored in the program storage unit 5 and, at the same time, reads out the diagnosis reference value and the diagnosis factor, respectively, from the diagnosis reference value storage unit 3 and the diagnosis factor storage unit 4 so as to compare the actual measured value which has been read out with the result of multiplication of the diagnostic reference value by the diagnosis factor and, then, diagnoses the normality/abnormality of the output of the photovoltaic power system based on that comparison result and, at the same time, diagnoses the cause of the abnormal case. The output unit 7 outputs and displays the diagnosis result by the diagnosis unit 2.

Here, for example, in the case that the above measurement unit 1 and the diagnosis unit 2 are configured by a CPU, the diagnosis reference value storage unit 3, the diagnosis factor storage unit 4, the program storage unit 5 and the measurement data memory unit 6 are configured of a hard disc device and the output unit 7 is configured of a liquid crystal display, the diagnosis apparatus of photovoltaic power system according to the first embodiment can be configured by one personal computer for all of the function parts, except for the pyrheliometer 8. Or, the above CPU and the hard disc device may be provided within the power adjuster 24 and the output unit 7 alone may be provided within the house.

Figure 2:
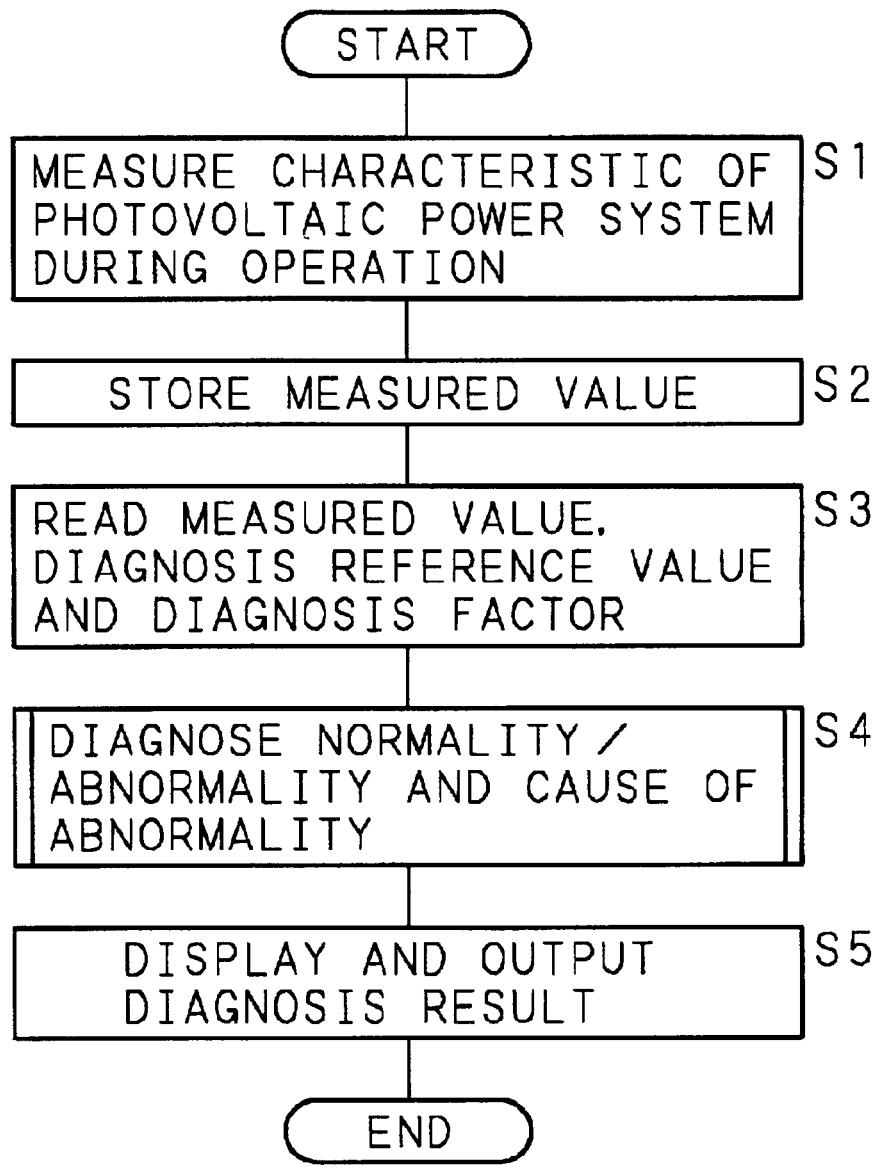
FIG. 2 is a flow chart showing an operation procedure of the diagnosis apparatus of photovoltaic power system according to the first embodiment.

Next, the operation of the diagnosis apparatus of photovoltaic power system according to the first embodiment having the above configuration is described in reference to the flow chart of FIG. 2 which shows the procedure thereof.

The values of the characteristic (direct current voltage, direct current, alternating current voltage, alternating current, electric power, electric energy, amount of solar radiation, or the like) of the photovoltaic power system during operation is measured by the measurement unit 1 (Step S1). Then, these measured values are averaged with a unit of one hour and the averaged measured value is stored in the measurement data memory unit 6 (Step S2).

The actual characteristic (measured value) gained by the measurement unit 1 is read out from the measurement data memory unit 6 and, at the same time, the diagnosis reference value and the diagnosis factor are read out from the diagnosis reference value storage unit 3 and the diagnosis factor storage unit 4 (Step S3). Based on these pieces of information which have been read out, the normality/abnormality of the output of the photovoltaic power system is diagnosed and, at the same time, the cause is also diagnosed in the abnormal case (Step S4). Here, in this diagnosis process, in the case that the lower limit diagnosis factor and the upper limit diagnosis factor are, respectively, denoted as r and s, the diagnosis has a result of normal when the condition of the following (1) is satisfied, of which the diagnosis process is described later in detail. The gained diagnosis result is outputted and displayed in the output unit 7 (Step S5).

$$\text{diagnosis reference value} \times r < \text{measured value} < \text{diagnosis reference value} \times s \quad (1)$$

Second Embodiment

Figure 3:
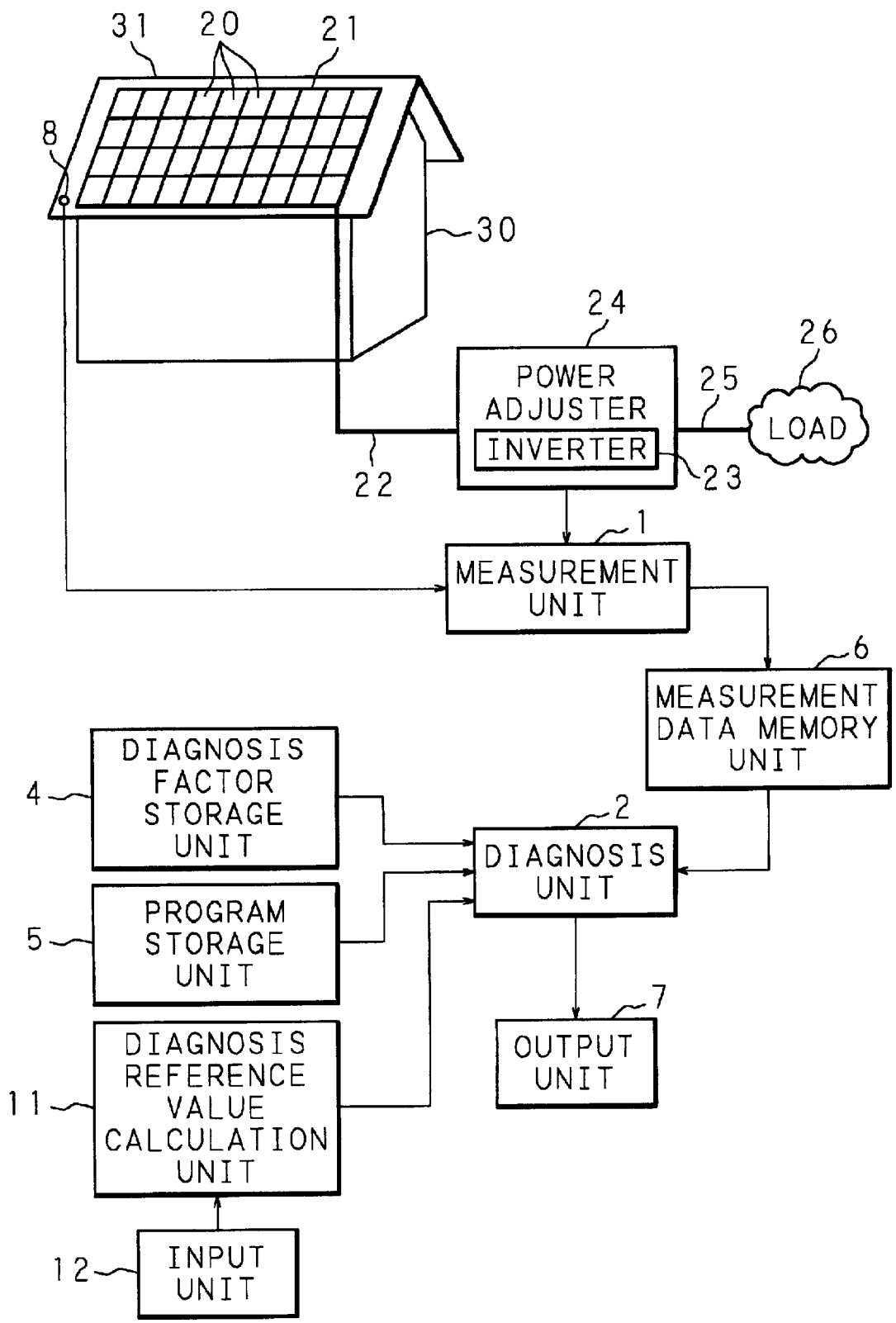
FIG. 3 is a schematic diagram showing a second embodiment of the present invention in which a diagnosis of a photovoltaic power system is carried out by using a diagnosis apparatus of photovoltaic power system.

FIG. 3 is a schematic diagram showing the second embodiment in which a diagnosis of a photovoltaic power system is carried out by using a diagnosis apparatus of photovoltaic power system according to the present invention. Here, in FIG. 3, the same or similar elements as in FIG. 1 are denoted as the same numerals, of which the descriptions are omitted.

The diagnosis apparatus of photovoltaic power system according to the second embodiment has a measurement unit 1, a diagnosis unit 2, a diagnosis reference value calculation unit 11, a diagnosis factor storage unit 4, a program storage unit 5, a measurement data memory unit 6, an output unit 7, a pyrheliometer 8 and an input unit 12.

The input unit 12 accepts an external inputs of the installation condition of the photovoltaic power system. The installation condition of the photovoltaic power system at this time includes the installation site (longitude, latitude, topography, meteorological condition, or the like), the installation direction (16 directions), the installation angle (inclination angle with respect to the ground surface), the configuration (types of solar batteries, number of cells in series, total area of cells (panel area)), or the like.

The diagnosis reference value calculation unit 11 calculates the diagnosis reference value as the reference output characteristic at the time of normal operation in accordance with the installation condition of the photovoltaic power system accepted by the input unit 12. These calculated parameters of the reference output characteristic are the same types of parameters of the output characteristic measured by the measurement unit 1 which are stored in the measurement data memory unit 6.

The diagnosis unit 2 reads out the actual characteristic (measured value) gained by the measurement unit 1 from the measurement data memory unit 6 in accordance with the operation program stored in the program storage unit 5 and, at the same time, reads out the diagnosis factor from the diagnosis factor storage unit 4 so as to compare the actual measured value which has been read out with the result of multiplication of the diagnosis reference value calculated by the diagnosis reference value calculation unit 11 by the read out diagnosis factor, and then diagnoses the normality/abnormality of the output of the photovoltaic power system based on that comparison result and, at the same time, diagnoses the cause of the abnormal case.

Here, for example, in the case that the above measurement unit 1, the diagnosis unit 2 and the diagnosis reference value calculation unit 11 are configured by a CPU, the diagnosis factor storage unit 4, the program storage unit 5 and the measurement data memory unit 6 are configured of a hard disk device, the output unit 7 is configured by a liquid crystal display and the input unit 12 is configured by a keyboard, the diagnosis apparatus of photovoltaic power system according to the second embodiment can be configured by one personal computer for all of the function parts, except for the pyrheliometer 8. Alternatively, the above CPU and the hard disc device may be provided within the power adjuster 24 and the output unit 7 alone may be provided within the house.

Figure 4:
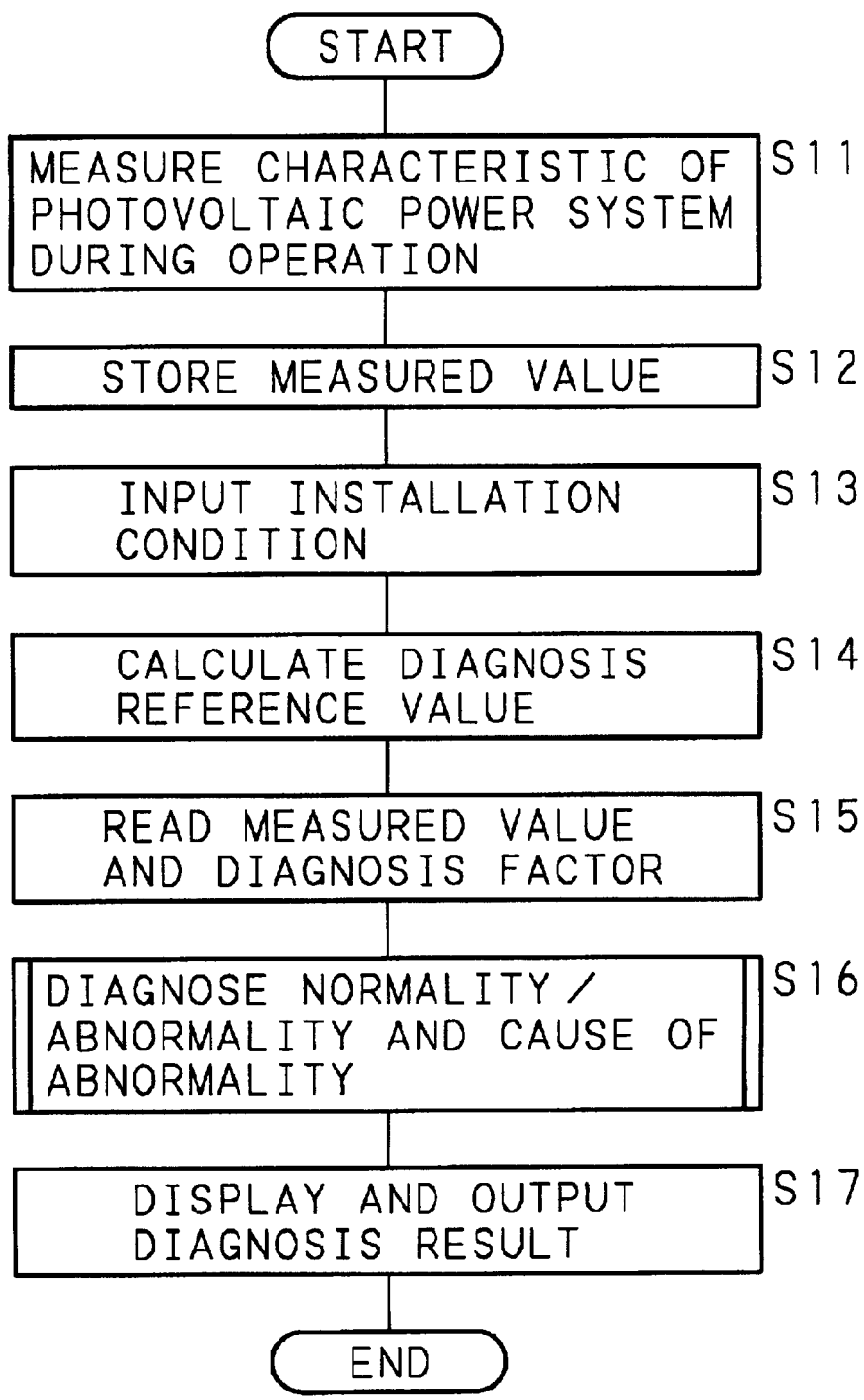
FIG. 4 is a flow chart showing an operation procedure of the diagnosis apparatus of photovoltaic power system according to the second embodiment.

Next, the operation of the diagnosis apparatus of photovoltaic power system according to the second embodiment that has such a configuration is described in reference to the flow chart of FIG. 4 which shows the procedure thereof.

The values of the characteristic (direct current voltage, direct current, alternating current voltage, alternating current, electric power, electric energy, amount of solar radiation, and the like) of the photovoltaic power system during operation are measured by the measurement unit 1 (Step S11). Then, these measured values are averaged with a unit of one hour so that the averaged measured value is stored in the measurement data memory unit 6 (Step S12).

The installation condition of the photovoltaic power system is inputted via the input unit 12 (Step S13). The diagnosis reference value as the reference output characteristic at the time of normal operation is calculated by the diagnosis reference value calculation unit 11 in accordance with the inputted installation condition (Step S14).

The actual characteristic (measured value) gained by the measurement unit 1 is read out from the measurement data memory unit 6 and, at the same time, the diagnosis factor is read out from the diagnosis factor storage unit 4 (Step S15). Based on these pieces of information which have been read out and the calculated diagnosis reference value, the normality/abnormality of the output of the photovoltaic power system is diagnosed and at the same time, in the abnormal case, the cause thereof is also diagnosed (Step S16). Here, the diagnosis has a result of normal when the condition of the above (1) is satisfied and this diagnosis process is later described in detail. The gained diagnosis result is outputted and displayed in the output unit 7 (Step S17).

Third Embodiment

Figure 5:
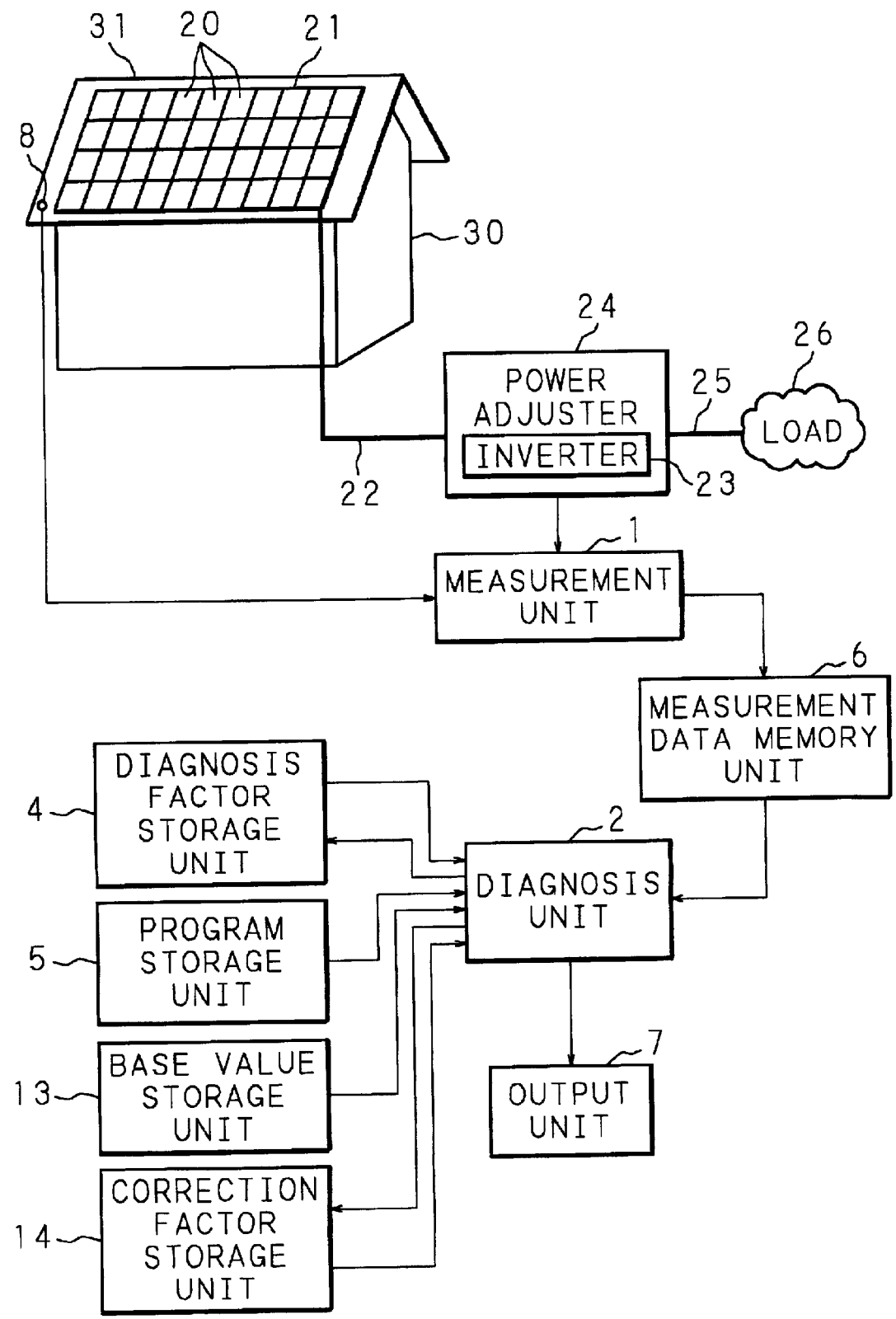
FIG. 5 is a schematic view showing a third embodiment of the present invention in which a diagnosis of a photovoltaic power system is carried out by using a diagnosis apparatus of photovoltaic power system.

FIG. 5 is a schematic diagram showing the third embodiment in which a diagnosis of a photovoltaic power system is carried out by using a diagnosis apparatus of photovoltaic power system according to the present invention. Here, in FIG. 5, the same or similar elements as in FIG. 1 or FIG. 3 are denoted by the same numerals, of which the descriptions are omitted.

The diagnosis apparatus of photovoltaic power system according to the third embodiment has a measurement unit 1, a diagnosis unit 2, a diagnosis factor storage unit 4, a program storage unit 5, a measurement data memory unit 6, an output unit 7, a pyrheliometer 8, a base value storage part 13 and a correction factor storage unit 14.

The base value storage unit 13 stores twelve types of base values (B) for respective months which become bases for obtaining the diagnosis reference values for respective months as the reference output characteristic. These base values are obtained in advance by taking into the consideration a variety of installation conditions of a photovoltaic power system as described above, in particular the meteorological condition for each month. The correction factor storage part 14 stores the correction factor (v) for correcting the base value in accordance with the value of the actual output characteristic due to the operation of the photovoltaic power system for many years. This correction factor is rewritten by the diagnosis unit 2 in accordance with the value of the output characteristic in the case that the photovoltaic power system has gained a normal output. Here, at the initial year, the correction factor v=1 is stored. In addition, in the course of operation of the photovoltaic power system for years, the diagnosis factors (r, s) stored in the diagnosis factor storage unit 4 are also rewritten by the diagnosis unit 2. Here, at the initial year, for example, the diagnosis factors r=0.7, s=1.3 are stored.

The diagnosis unit 2, in accordance with the operation program stored in the program storage unit 5, obtains the diagnosis reference value by multiplying the base value read out from the base value storage unit 13 by the correction factor read out from the correction factor storage unit 14 and compares the actual measured value at present which has been read out from the measurement data memory unit 6 with the result of multiplication of that obtained diagnosis reference value by the diagnosis factor read out from the diagnosis factor storage unit 4, and then diagnoses the normality/abnormality of the output of the photovoltaic power system based on that comparison result and, at the same time, diagnoses the cause of the abnormal case.

Here, for example, in the case that the above measurement unit 1 and the diagnosis unit 2 are configured by a CPU, the diagnosis factor storage unit 4, the program storage unit 5, the measurement data memory unit 6, the base value storage unit 13 and the correction factor storage unit 14 are configured by a hard disk device and the output unit 7 is configured by a liquid crystal display, the diagnosis apparatus of photovoltaic power system according to the third embodiment can be configured by one personal computer for all of the function parts, except for the pyrheliometer 8. Alternatively, the above CPU and the hard disc device may be provided within the power adjuster 24 and the output unit 7 alone may be provided within the house.

Figure 6:
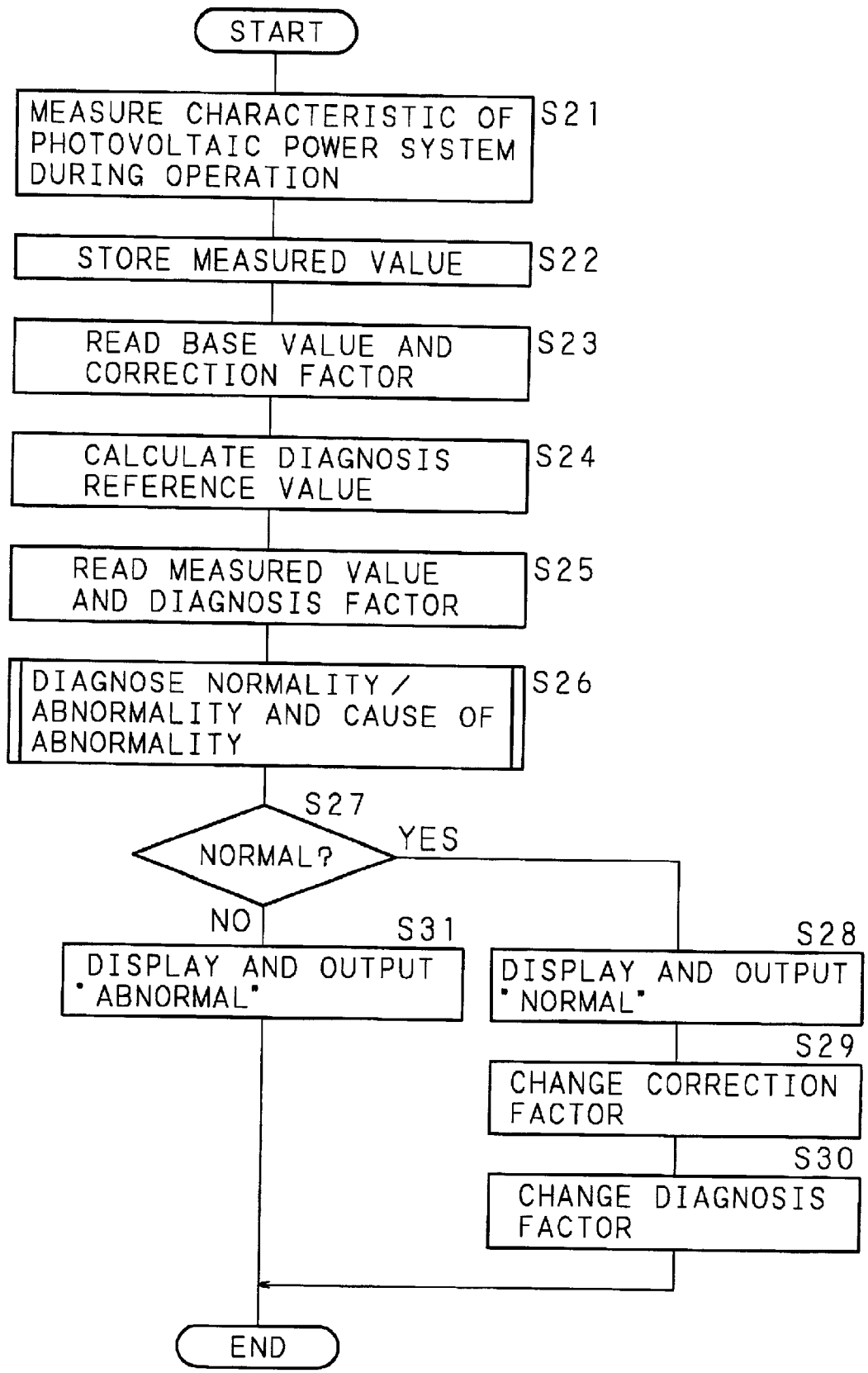
FIG. 6 is a flow chart showing an operation procedure of the diagnosis apparatus of photovoltaic power system according to the third embodiment.

Next, the operation of the diagnosis apparatus of photovoltaic power system according to the third embodiment that has such a configuration is described in reference to the flow chart of FIG. 6 which shows the procedure thereof.

The values of the characteristic (direct current voltage, direct current, alternating current voltage, alternating current, electric power, electric energy, amount of solar radiation, and the like) of the photovoltaic power system during operation are measured by the measurement unit 1 (Step S21). Then, these measured values are averaged with a unit of one hour so that the averaged measured value is stored in the measurement data memory unit 6 (Step S22).

The base value and the correction factor are respectively read out from the base value storage unit 13 and the correction factor storage unit 14 (Step S23) and they are multiplied with each other so as to obtain a diagnosis reference value as the reference output characteristic (Step S24). The actual measured value gained by the measurement unit 1 is read out from the measured data memory unit 6 and, at the same time, the diagnosis factor is read out from the diagnosis factor storage unit 4 (Step S25). Based on these pieces of information which have read out and the obtained diagnosis reference value, the normality/abnormality of the output of the photovoltaic power system is diagnosed and, at the same time, in the abnormal case, the cause thereof is diagnosed (Step S26). At this time, the diagnosis has a result of normal when the condition of the above (1) is satisfied while the diagnosis has a result of abnormal in other cases. Here, the diagnosis process of the cause is later described in detail.

Whether or not the diagnosis result is normal is determined (Step S27) and, in the abnormal case (S27: NO), the output unit 7 outputs and makes a display to that effect (Step S31) so as to complete the process as it is.

On the other hand, in the normal case (S27: YES), after the output unit 7 outputs and makes a display to that effect (Step S28), the correction factor is changed in accordance with the actual measured value at that time so that the new correction factor is written into the correction factor storage unit 14 (Step S29) and, at the same time, the diagnosis factor is also changed and the new diagnosis factor is written into the diagnosis factor storage unit 4 (Step S30).

In the following, an example of this diagnosis process in the third embodiment is described. Here, the output characteristic which becomes the diagnosis reference is assumed to be electric energy, the diagnosis process in January of every year (for three years) is described.
<First Year>
The base value B=100 kWh is stored in the base value storage unit 13, the correction factor v=1 is stored in the correction factor storage unit 14, the lower limit diagnosis factor r=0.7 and the upper limit diagnosis factor s=1.3 are stored in the diagnosis factor storage unit 4, respectively, as initial values. By multiplying this base value B=100 kWh by the correction factor v=1, the diagnosis reference value 100 kWh is obtained (S24). The actual measured value is assumed to be 120 kWh. In this case, the condition of the above (1) is satisfied as shown in (2) below and, therefore, the electric energy is diagnosed as normal (S26).

$$\text{diagnosis reference value } (100) \times r(0.7) < \text{actual measured value} \\ (120) < \text{diagnosis reference value } (100) \times s(1.3) \qquad (2)$$

Because the diagnosis has the result of normal (S27: YES), "normal" is outputted and displayed in the output unit 7 (S28). In addition, the correction factor v of the correction factor storage unit 14 is changed (S29). More specifically, the average value 1.1 between actual measured value (120) ÷base value (100)=1.2 and present v=1 is written into the correction factor storage unit 14 as a new correction factor v. In addition, the diagnosis factors r, s of the diagnosis factor storage unit 4 are changed (S30). More specifically, because the actual measured value is reflected for the correction factor, the diagnosis factors r, s are both made closer to 1 by 0.01 so as to be r=0.71, s=1.29, which are written into the diagnosis factor storage unit 4.
<Second Year>
At this point in time, the base value B=100 kWh is stored in the base value storage unit 13, the correction factor v=1.1 is stored in the correction factor storage unit 14, the lower limit diagnosis factor r=0.71 and the upper limit diagnosis factor s=1.29 are stored in the diagnosis factor storage unit 4, respectively. By multiplying this base value B=100 kWh by the correction factor v=1.1, the diagnosis reference value 110 kWh is obtained (S24). The actual measured value is assumed to be 77 kWh. In this case, the condition of the above (1) is not satisfied as the following (3) and, therefore, the electric energy is diagnosed as abnormal (S26).

$$\text{actual measured value } (77) < \text{diagnosis reference value} \\ (110) \times r(0.71) \qquad (3)$$

Because the diagnosis has the result of abnormal (S27: NO), "abnormal" is outputted and displayed in the output unit 7 (S31). Here, because the abnormality is obtained, the correction factor and the diagnosis factor are not changed.
<Third Year>
At this point in time, in the same manner as in the second year, the base value B=100 kWh is stored in the base value storage unit 13, the correction factor v=1.1 is stored in the correction factor storage unit 14, the lower limit diagnosis factor r=0.71 and the upper diagnosis factor s=1.29 are stored in the diagnosis factor storage unit 4, respectively. By multiplying this base value B=100 kWh by the correction factor v=1.1, the diagnosis reference value 110 kWh is obtained (S24). The actual measured value is assumed to be 130 kWh. In this case, the condition of the above (1) is satisfied as in the following (4) and, therefore, the electric energy is diagnosed as normal (S26).

$$\text{diagnosis reference value } (110) \times r \ (0.71) < \text{actual measured value} \\ (130) < \text{diagnosis reference value } (110) \times s \ (1.29) \qquad (4)$$

Because the diagnosis has the result of normal (S27: YES), "normal" is outputted and displayed in the output unit 7 (S28). In addition, the correction factor v of the correction factor storage unit 14 is changed (S29). More specifically, the average value 1.2 between actual measured value (130) ÷base value (100)=1.3 and present v=1.1 is written into the correction factor storage unit 14 as a new correction factor v. In addition, the diagnosis factors r, s of the diagnosis factor storage unit 4 are changed (S30). More concretely, since the actual measured value is reflected for the correction factor, the diagnosis factors r, s are both further made closer to 1 by 0.01 so as to be r=0.72, s=1.28, which are written into the diagnosis factor storage unit 4.

Here, though in this third embodiment the base value stored in the base value storage unit 13 is assumed not to change, it is preferable to change the base value to correspond to changes in the surrounding environment in the case that those changes are large, such as the construction of a large building in the neighborhood. At this time, as for the changed base value, a simulation result which is obtained again after taking respective conditions into consideration in the same manner as in the case of the initial value may be adopted or the actual measured value after the change of the environment may be adopted. In addition, though in the specific example of the third embodiment the base value, the diagnosis reference value, or the like, are made to be different for every month, that period may be arbitrarily set and those values may be made different for each season (spring, summer, autumn and winter).

In addition, the value of the output characteristic actually measured for each month (or for each season) and the average value of the measurement result of the output characteristic for the same month (or for the same season) over the past several years are simply compared and, based on this comparison result, a diagnosis to determine normality/abnormality of a photovoltaic power system and to find the cause of the abnormality may be carried out.

Figure 7:
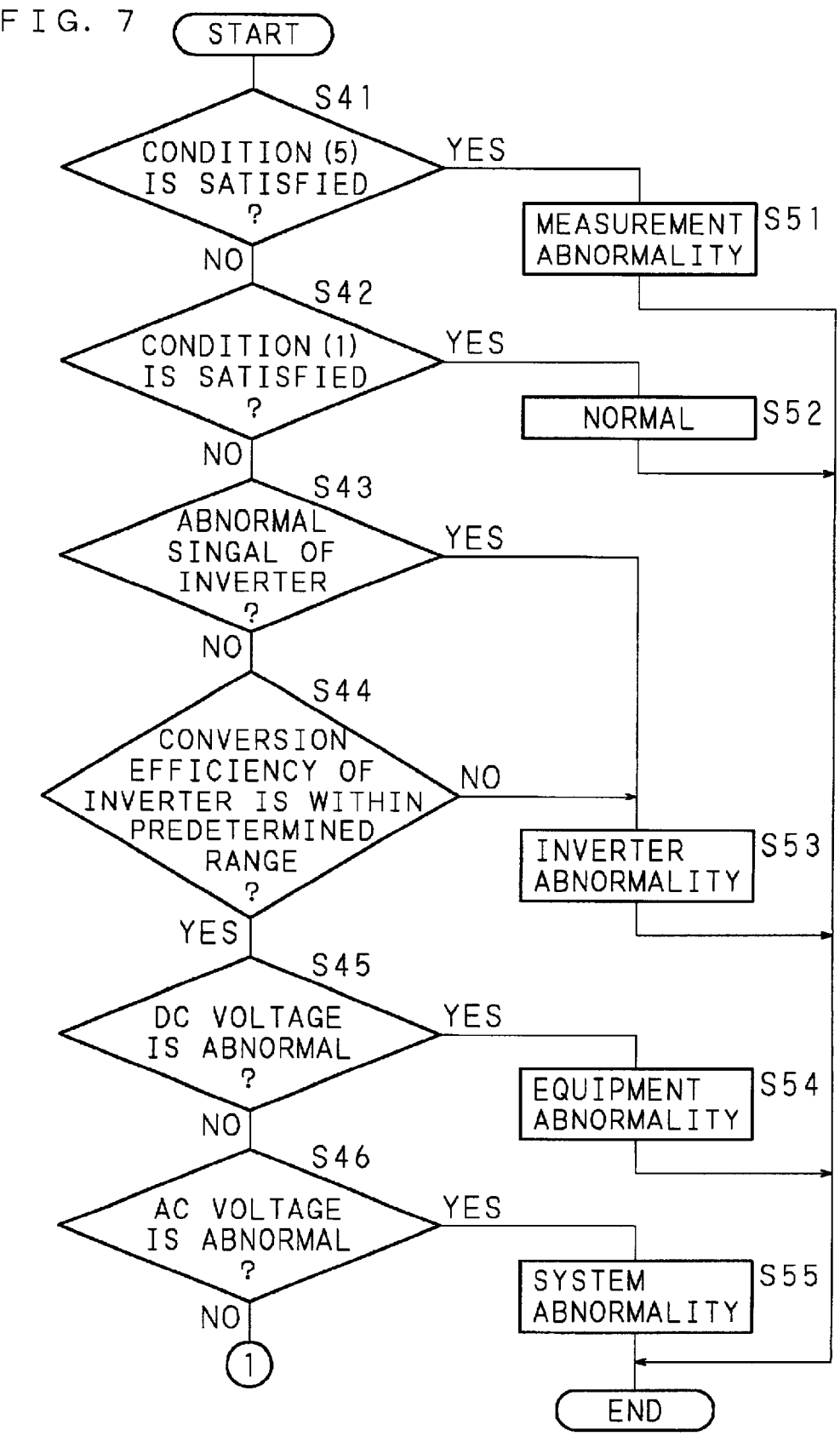
FIG. 7 is a flow chart showing a procedure of a diagnosis process according to the present invention.
Figure 8:
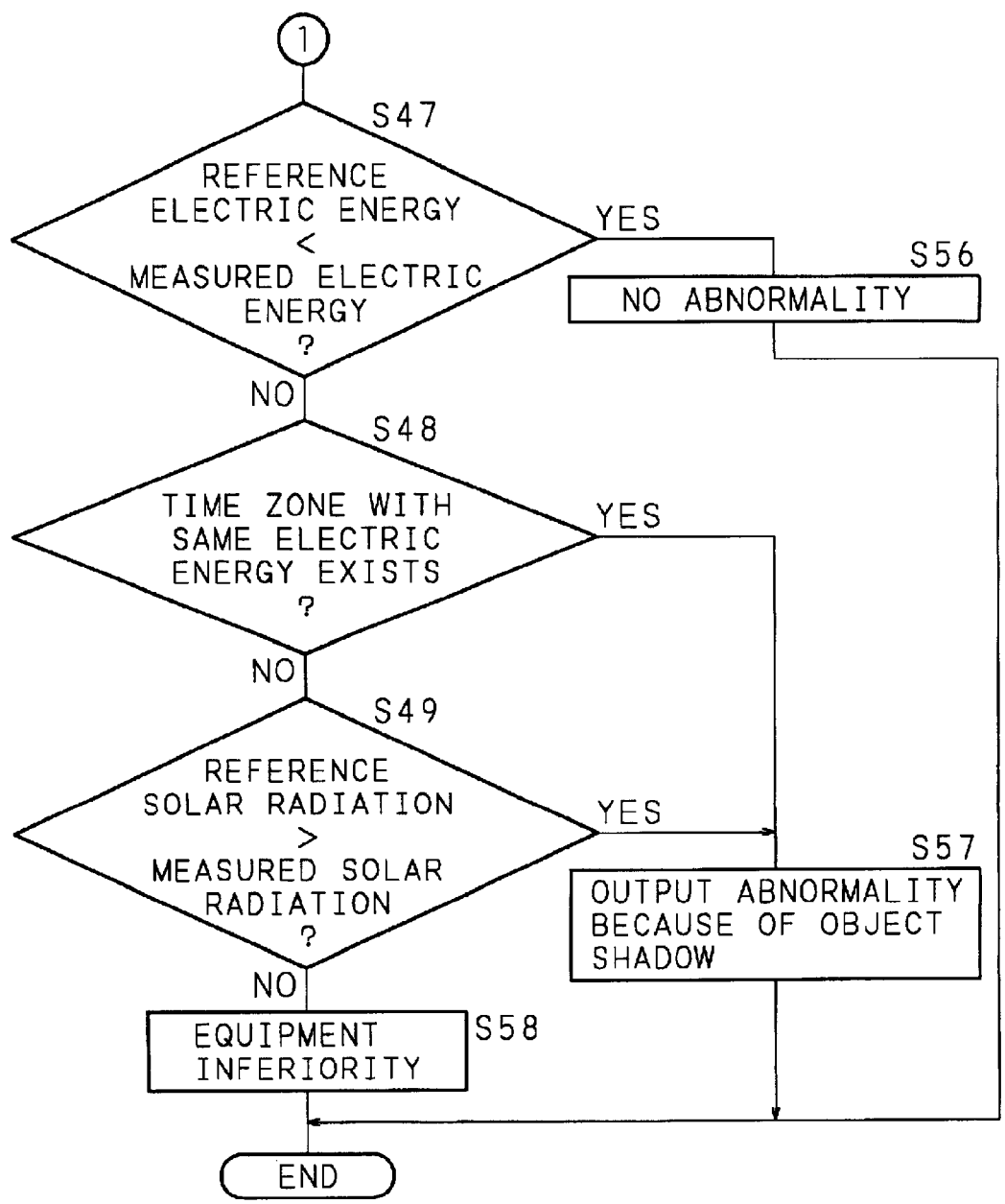
FIG. 8 is a flow chart showing a procedure of a diagnosis process according to the present invention.

Next, the process for diagnosing the normality/abnormality of the output of a photovoltaic power system in the above described first, second and third embodiments, as well as the cause of the abnormality, is described in detail. FIGS. 7 and 8 are flow charts showing the operation procedure of that diagnosis process, that is to say, the sub-routines of S4 of FIG. 2, S16 of FIG. 4 and S26 of FIG. 6.

With respect to each measured value (direct current voltage, direct current, alternating current voltage, alternating current, electric power, electric energy) of the actual output characteristic and each diagnosis reference value (direct current voltage, direct current, alternating current voltage, alternating current, electric power, electric energy) as the reference output characteristic, whether or not the condition in the following (5) is satisfied is determined (Step S41). Here, p, q are constants of diagnosis factors stored in the diagnosis factor storage unit 4 wherein, for example, p=2, q=0.5.

$$\text{diagnosis reference value} \times p < \text{measured value or diagnosis reference value} \times q > \text{measured value} \quad (5)$$

In the case that the condition (5) is satisfied (S41: YES), the measurement is determined to be abnormal (Step S51) and no diagnosis process is carried out. On the other hand, in the case that the condition (5) is not satisfied (S41: NO), whether or not the condition of the above (1) is satisfied is determined for each measured value and for each diagnosis reference value (Step S42).

In the case that the condition (1) is satisfied (S42: YES), the photovoltaic power system is diagnosed as normal (Step S52). On the other hand, in the case that the condition (1) is not satisfied (S42: NO), the following process for diagnosing the cause of the abnormality is carried out.

Figure 9:
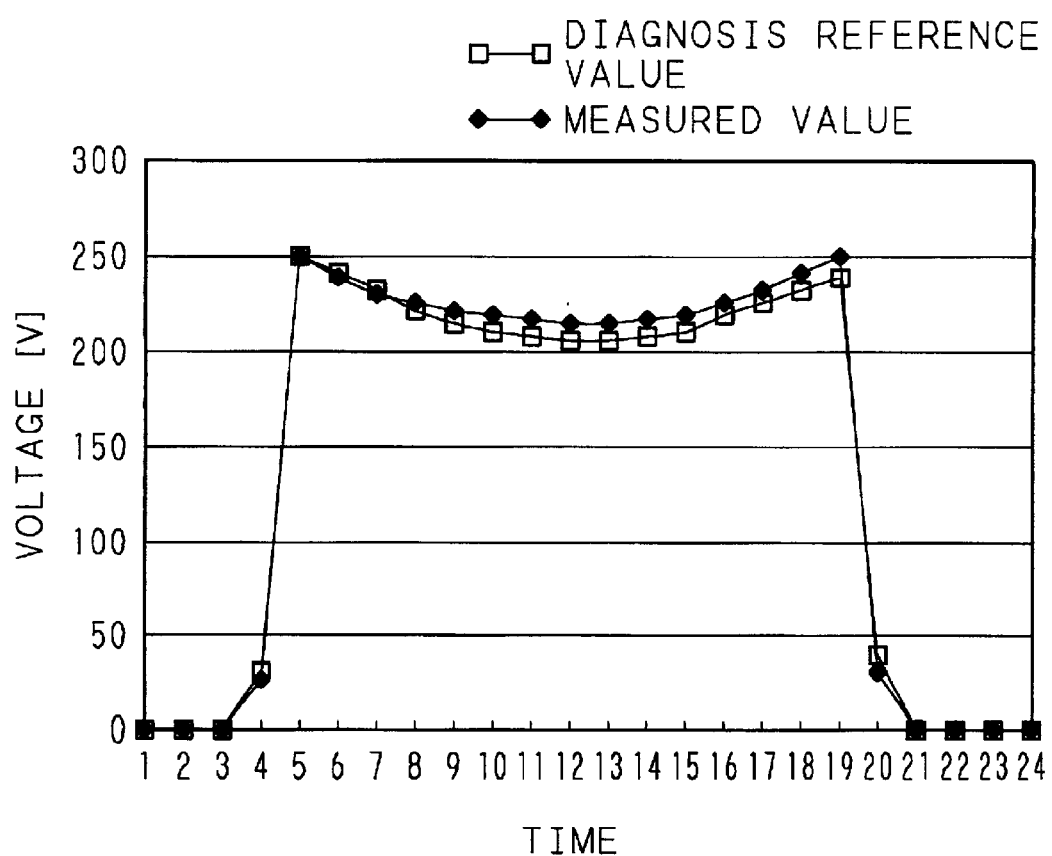
FIG. 9 is a graph showing the relationship between the reference output characteristic (direct current voltage) at the time of normal operation and the actually measured output characteristic (direct current voltage)
Figure 10:
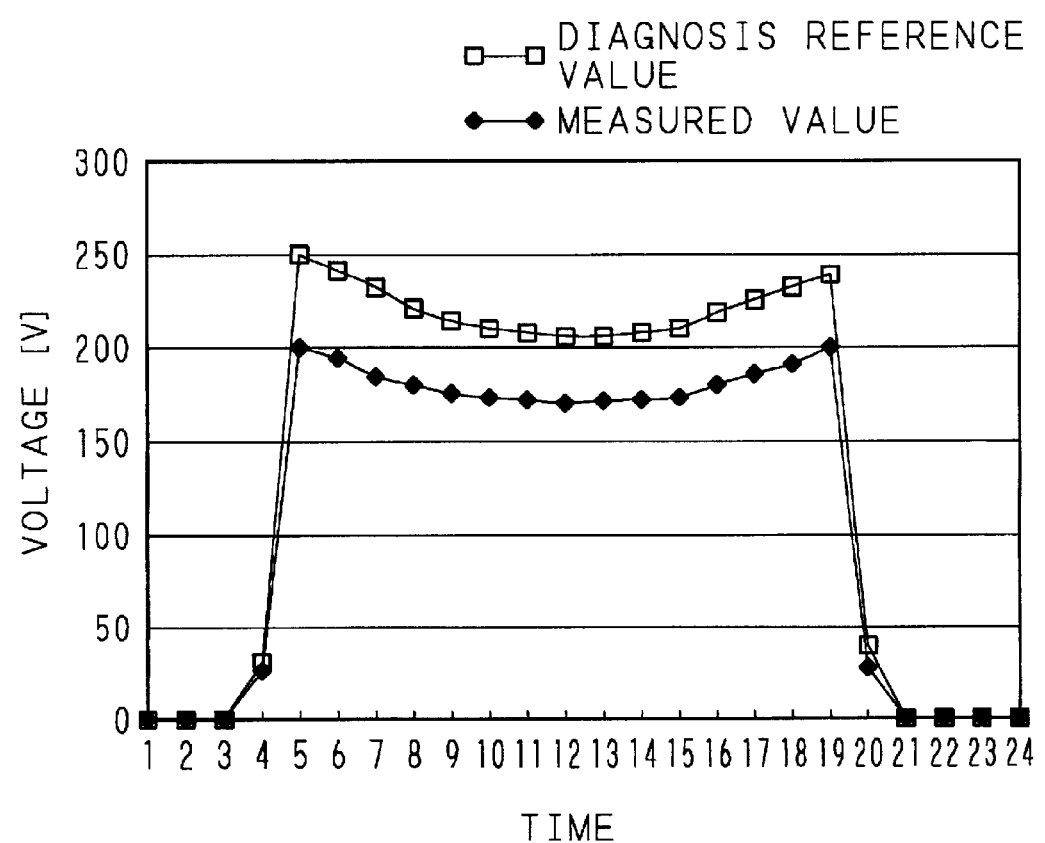
FIG. 10 is a graph showing the relationship between the reference output characteristic (direct current voltage) at the time of abnormal operation and the actually measured output characteristic (direct current voltage)

FIGS. 9 and 10 are graphs showing the relationships between the measured value of the direct current voltage and the diagnosis reference value thereof in a particular installed photovoltaic power system (installation site: within Osaka city limits, installation direction: facing to the west, installation angle: 30 degrees, maximum electric power: 3 kW) in June. In the graph of FIG. 9, because the measured value and the diagnosis reference value satisfy the condition (1), the diagnosis has the result of normal. On the other hand, in the graph of FIG. 10, because the above values satisfy neither of the conditions of (5) nor (1), the diagnosis has the result of abnormal.

Figure 11:
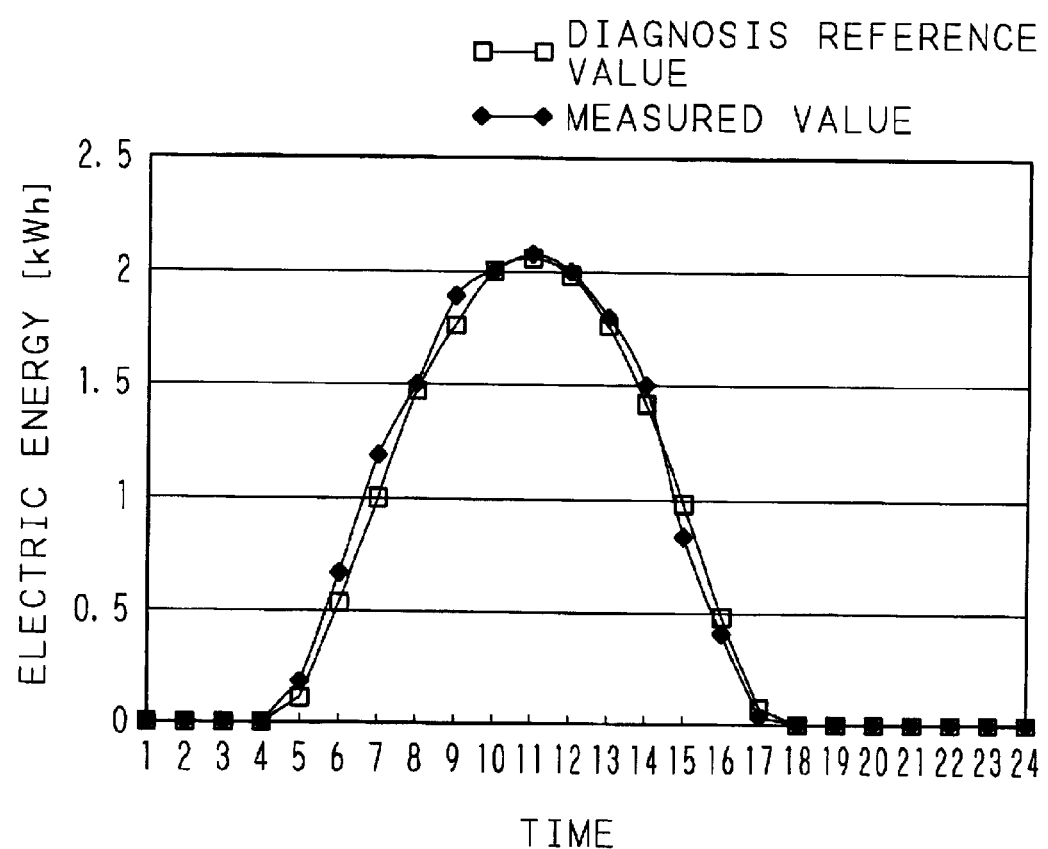
FIG. 11 is a graph showing the relationship between the reference output characteristic (electric energy) at the time of normal operation and the actually measured output characteristic (electric energy)
Figure 12:
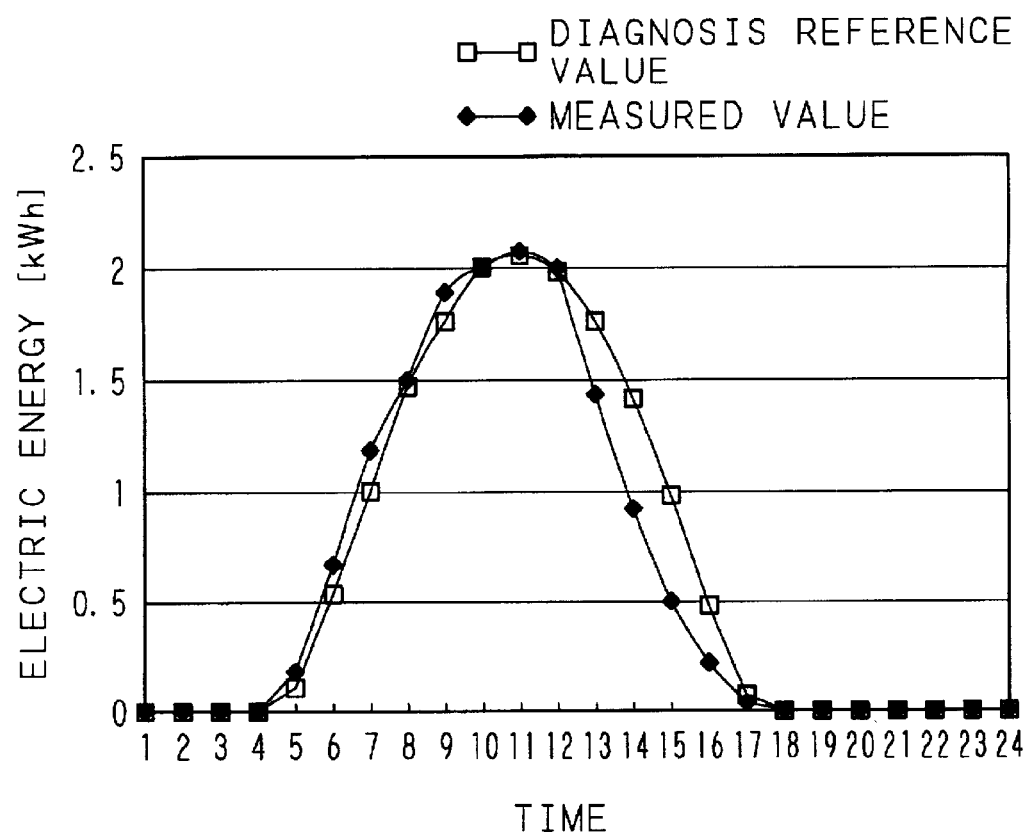
FIG. 12 is a graph showing the relationship between the reference output characteristic (electric energy) at the time of abnormal operation and the actually measured output characteristic (electric energy).

FIGS. 11 and 12 are graphs showing the relationships between the measured value of the electric energy and the diagnosis reference value thereof in the photovoltaic power system installed under the same condition as the above. In the graph of FIG. 11, because the measured value and the diagnosis reference value satisfy the condition (1), the diagnosis has the result of normal. On the other hand, in the graph of FIG. 12, because the above values do not satisfy the condition (5) and do not satisfy the condition (1) during the time period from 13:00 to 16:00, the diagnosis has the result of abnormal.

Whether or not an abnormal signal of the inverter exists is determined (Step S43) and, in the case of such existence (S43: YES), the diagnosis has the result of an abnormality of the inverter 23 (Step S53). In addition, the conversion efficiency of the inverter (=alternating current electric energy/direct current electric energy) is obtained so that whether or not this value is within the range of 0.8 to 0.97 is determined (Step S44). In the case that it is not in that range (S44: NO), the diagnosis is an abnormality of the inverter 23 (S53).

Whether or not the direct current voltage is abnormal is determined (Step S45) and, in the abnormal case (S45: YES), the diagnosis has the result of an abnormal equipment (more concretely, abnormality in the solar battery panel 21 or in the wire 22 for taking out the output) (Step S54). A diagnosis example of this case corresponds to FIG. 10. Whether or not the alternating current voltage is abnormal is determined (Step S46) and, in the abnormal case (S46: YES), the diagnosis has the result of an abnormal system (Step S55). In the case that the alternating current voltage exceeds a predetermined range (101±6V), it is legally prescribed that the adjustment must be carried out within the power adjuster 24 so that the diagnosis has the result of abnormality due to this adjustment function.

The alternating current electric energy of the reference output characteristic and the actually measured alternating current electric energy are compared (Step S47). In the case that the latter is larger than the former (S47: YES), because the measured electric energy is greater than the reference electric energy, the system doesn't have any problems and the diagnosis has a result of no abnormality (Step S56).

With respect to the alternating current electric energy of the reference output characteristic and the actually measured alternating current electric energy, whether or not there is a time zone where the two are equal is determined (Step S48). In the case that this time zone exists (S48: YES), the diagnosis has a result of abnormal of the output decrease due to the shadows of buildings, trees, or the like, which exist around the house (Step S57). A diagnosis example of this case corresponds to FIG. 12. In the example, as shown in FIG. 12, the reference electric energy and the measured electric energy are almost equal in the morning and in the afternoon (between 13:00 and 16:00) the measured electric energy is significantly lower than the reference electric energy and, therefore, it is considered that the output is lowered due to the existence of shadows of blocking objects such as buildings or trees to the west of this house, with reference to the position of the sun.

The reference amount of solar radiation and the actually measured amount of solar radiation are compared (Step S49). In the case that the former is larger than the latter (S49: YES), the diagnosis has a result of abnormal of the output decrease due to shadows (S57). In the other case (S49: NO), the diagnosis has a result of inferior equipment (Step S58). As for the inferior equipment, a slightly smaller output of the installed solar battery panel 21 than the standard value, the lengthening of wires leading to increase in the resistance value, or the like, are cited.

Here, the above described diagnosis reference of the normality/abnormality in the process, as well as the diagnosis reference of the cause of abnormality, serve as examples and other diagnosis references may, of course, be used.

In addition, the diagnosis apparatus in the first to the third embodiments may be built in, in advance, in the installed photovoltaic power system or may be attached to the photovoltaic power system through connection at the time of the diagnosis process. Furthermore, although a photovoltaic power system wherein the output from the power adjuster 24 is directly supplied to the load 26 is described in the first to the third embodiments, the present invention is, of course, not limited to this but, rather, can be applied to a photovoltaic power system which is systematically connected to a commercial power source.

Here, although in a newly installed photovoltaic power system, the above described diagnosis reference values in the first and second embodiments, as well as the base value in the third embodiment, are obtained by considering the installation condition, in the case that another photovoltaic power system exists in the vicinity wherein this condition is the same, or similar, it is possible to utilize the diagnosis reference value, the base value or the actual output characteristic (measured value) as it is, or after a fine adjustment, for the above diagnosis reference value and for the above base value. In addition, in the case that such a photovoltaic power system does not exist in the vicinity, it is also possible to acquire such pieces of information from a photovoltaic power system during operation which is installed in a remote location.

As described above, in the present invention, the reference output characteristic at the time of normal operation which is obtained based on the installation condition and the actual output characteristic during operation are compared and, based on this comparison result, the normality/abnormality of the output is diagnosed and, at the same time, the cause of the case of abnormal output is also diagnosed if necessary and, therefore, precise results of these diagnoses can be quickly gained.

In addition, in the present invention, the reference output characteristic at the time of normal operation is calculated based on the installation condition and the calculated reference output characteristic and the actually measured output characteristic are compared so that, based on this comparison result, the normality/abnormality of the output is diagnosed and, at the same time, the cause of the case of abnormal output is also diagnosed if necessary and, thereby, precise results of these diagnoses can be gained and since the reference output characteristic is calculated according to the installation condition, it is not necessary to store many reference output characteristics in a memory so that it becomes possible to correspond to a variety of installation conditions.

In addition, in the present invention, as for the installation condition of a photovoltaic power system, at least the site, the direction, the angle and the configuration are used and, therefore, precise data of reference output characteristic can be obtained and, as a result, it becomes possible to gain a precise diagnosis result.

In addition, in the present invention, the measured output characteristic is stored in a memory and, therefore, a diagnosis process can be carried out at an arbitrary point in time.

In addition, in the present invention, because the past output characteristic is stored so that the past output characteristic is taken into consideration to diagnose the normality/abnormality of the output of the photovoltaic power system and, at the same time, to diagnose the cause of the case of abnormal output if necessary, it becomes possible to gain a precise diagnosis result which reflects the effect of the characteristic particular to the photovoltaic power system to be diagnosed.

In addition, in the present invention, the reference output characteristic at the time of normal operation is obtained in accordance with the past output characteristic and the obtained reference output characteristic and the actually measured output characteristic are compared so that this comparison result is taken into consideration in order to diagnose the normality/abnormality of the output and, therefore, since the reference output characteristic is obtained in accordance with the past actual output characteristic, the optimal reference output characteristic suitable for each photovoltaic power system can easily be obtained so that it becomes possible to quickly gain a precise diagnosis result.

In addition, in the present invention, because reference output characteristics different for each of the plurality of periods of time gained by dividing a year are set by taking the seasonal changes in the meteorological condition into consideration, the reference output characteristic that is always optimal throughout the year can be obtained so that it becomes possible to quickly gain a precise diagnosis result.

In addition, in the present invention, in the case of abnormal output characteristic, this output characteristic is not reflected in the subsequent reference output characteristic and only in the case of normal output characteristic is this output characteristic in the subsequent reference output characteristic and, therefore, it becomes possible to obtain a reference output characteristic with a high precision in a chronological manner.

In addition, in the present invention, because at least, direct current voltage, alternating current voltage, direct current electric energy, alternating current electric energy, are used as the reference output characteristic and the output characteristic, diagnosis can be carried out from multiple aspects so that it becomes possible to correctly diagnose not only the cause of the abnormal component but also to correctly diagnose other causes.

In addition, in the present invention, because the actual amount of solar radiation is measured, the data of the amount of solar radiation can be acquired as the data for diagnosis so as to carry out a diagnosis from multiple aspects of a greater number.

Furthermore, in the present invention, because the reference output characteristic is acquired from another photo voltaic power system of which the installation condition and system characteristic are similar, it becomes possible to more easily obtain a precise reference output characteristic.

As this invention may be embodied in several forms without departing from the spirit of essential characteristics thereof, the present embodiment is therefore illustrative and not restrictive, since the scope of the invention is defined by the appended claims rather than by the description preceding them, and all change that fall within metes and bounds of the claims, or equivalence of such metes and bounds thereof are therefore intended to be embraced by the claims.

What is claimed is:

1. A method for diagnosing the normality/abnormality of an output of an installed photovoltaic power system, comprising the steps of:

comparing a reference output characteristic obtained chronologically in accordance with an installation condition of said photovoltaic power system with a measured output characteristic in said photovoltaic power system obtained during operation of the photovoltaic power system itself, said installation condition includes a topography of an installation site, meteorological conditions and configuration of the photovoltaic power system, and diagnosing the normality/abnormality of the output of said photovoltaic power system based on the comparison result, wherein said photovoltaic power system in diagnosed as normal only if said measured output characteristic is greater than a first predetermined value and less than a second predetermined value, said first and second predetermined values being based on said reference output characteristic, wherein comparisons of the reference output characteristic and the measured output characteristic are performed at different time points of a day, wherein said photovoltaic power system is diagnosed as normal if the following condition is satisfied, a base value (b) times a correction factor (v) times a lower limit diagnosis factor (r) is less than an actual measured value which is less than the base value (b) times the correction factor (v) times an upper limit diagnosis factor (s).

2. The diagnosis method according to claim 1, wherein the installation condition of said photovoltaic power system includes, at least, one of the following installation site, installation direction, installation angle and configuration.

3. The diagnosis method according to claim 1, further comprising the step of:

diagnosing the cause, in the case that the output of said photovoltaic power system is abnormal, based on the comparison result.

4. The diagnosis method according to claim 1, wherein the reference output characteristic and the output characteristic include, at least, one of the following: direct current voltage, alternating current voltage, direct current electric energy and alternating current electric energy.

5. The diagnosis method according to claim 1, wherein said reference output characteristic vary in accordance with actually measured output characteristic.

6. A method for diagnosing the normality/abnormality of an output of an installed photovoltaic power system, comprising the steps of:

calculating a reference output characteristic chronologically at the time of normal operation of the photovoltaic power system itself in accordance with an installation condition of said photovoltaic power system;

measuring an output characteristic chronologically in said photovoltaic power system obtained during operation of the photovoltaic power system itself;

comparing the calculated reference output characteristic chronologically with the measured output characteristic; and diagnosing the normality/abnormality of the output of said photovoltaic power system based on the comparison result, wherein comparisons of the reference output characteristic and the measured output characteristic are performed at different time points of a day, wherein said photovoltaic power system is diagnosed as normal if the following condition is satisfied, a base value (b) times a correction factor (v) times a lower limit diagnosis factor (r) is less than an actual measured value which is less than the base value (b) times the correction factor (v) times an upper limit diagnosis factor (s).

7. The diagnosis method according to claim 6, wherein the installation condition of said photovoltaic power system includes, at least, one of the following: installation site, installation direction, installation angle and configuration.

8. The diagnosis method according to claim 6, further comprising the step of:

diagnosing the cause, in the case that the output of said photovoltaic power system is abnormal, based on the comparison result.

9. The diagnosis method according to claim 6, wherein the reference output characteristic and the output characteristic include, at least, one of the following: direct current voltage, alternating current voltage, direct current electric energy and alternating current electric energy.

10. A method for diagnosing the normality/abnormality of an output of a photovoltaic power system, comprising the step of:

diagnosing the normality/abnormality of the output of said photovoltaic power system during operation based on the past measurement result of an output characteristic chronologically of said photovoltaic power system itself, wherein comparisons of the reference output characteristic and the measured output characteristic are performed at different time points of a day, wherein said photovoltaic power system is diagnosed as normal if the following condition is satisfied, a base value (b) times a correction factor (v) times a lower limit diagnosis factor (r) is less than an actual measured value which is less than the base value (b) times the correction factor (v) times an upper limit diagnosis factor (s).

11. The diagnosis method according to claim 10, wherein said reference output characteristic vary in accordance with actually measured output characteristic.

12. A method for diagnosing the normality/abnormality of an output of a photovoltaic power system, comprising the steps of:

obtaining a reference output characteristic chronologically at the time of normal operation of the photovoltaic power system itself in accordance with past measurement result of an output characteristic of said photovoltaic power system;

measuring an output characteristic chronologically in said photovoltaic power system during operation of the photovoltaic power system itself;

comparing the obtained reference output characteristic chronologically with the measured output characteristic; and diagnosing the normality/abnormality of the output of said photovoltaic power system based on the comparison result, wherein comparisons of the reference output characteristic and the measured output characteristic are performed at different time points of a day, wherein said photovoltaic power system is diagnosed as normal if the following condition is satisfied, a base value (b) times a correction factor (v) times a lower limit diagnosis factor (r) is less than an actual measured value which is less than the base value (b) times the correction factor (v) times an upper limit diagnosis factor (s).

13. The diagnosis method according to claim 12, wherein the reference output characteristic is obtained differently for each period of time among the plurality of periods of time gained by dividing a year.

14. The diagnosis method according to claim 12, wherein in the case that the output of said photovoltaic power system is diagnosed as being abnormal the output characteristic at that time is not reflected in the subsequent reference output characteristic, the output characteristic at that time output of said photovoltaic power system is diagnosed as being normal the output characteristic at that time is reflected in the subsequent reference output characteristic.

15. The diagnosis method according to claim 12, further comprising the step of:
diagnosing the cause, in the case that the output of said photovoltaic power system is abnormal, based on the comparison result.

16. The diagnosis method according to claim 12, wherein the reference output characteristic and the output characteristic include, at least, one of the following: direct current voltage, alternating current voltage, direct current electric energy and alternating current electric energy.

17. A method for diagnosing the normality/abnormality of an output of a photovoltaic power system, comprising the steps of:
obtaining a reference output characteristic at the time of normal operation of a first photovoltaic power system to be diagnosed in accordance with a measurement result of output characteristic of a second photovoltaic power system, said first and second photovoltaic power system being installed at different sites;
measuring an output characteristic in said first photovoltaic power system during operation;
comparing the obtained reference output characteristic with the measured output characteristic; and
diagnosing the normality/abnormality of the output of said first photovoltaic power system based on the comparison result,
wherein comparisons of the reference output characteristic and the measured output characteristic are performed at different time points of a day.

18. An apparatus for carrying out a diagnosis of the normality/abnormality of an output of an installed photovoltaic power system and/or a diagnosis of the cause whenever the output of said photovoltaic power system is abnormal, comprising:
a storage unit for storing a reference output characteristic chronologically at a time of normal operation of the photovoltaic power system itself in accordance with an installation condition of said photovoltaic power system;
a measurement unit for measuring an output characteristic chronologically in said photovoltaic power system during operation of the photovoltaic power system itself; and
a comparison unit for comparing the reference output characteristic chronologically stored in said storage unit with the measured the output characteristic obtained by said measurement unit,
wherein said photovoltaic power system is diagnosed as normal only if said measured output characteristic is greater than a first predetermined value and less than a second predetermined value, said first and second predetermined values being based on said reference output characteristic,
wherein comparisons of the reference output characteristic and the measured output characteristic are performed at different time points of a day,
wherein said photovoltaic power system is diagnosed as normal if the following condition is satisfied, a base value (b) times a correction factor (v) times a lower limit diagnosis factor (r) is less than an actual measured value which is less than the base value (b) times the correction factor (v) times an upper limit diagnosis factor (s).

19. The diagnosis apparatus according to claim 18, further comprising:
a storage unit for storing the output characteristic measured by said measurement unit.

20. The diagnosis apparatus according to claim 18, further comprising:
a solar radiation amount measurement unit for measuring an amount of solar radiation in said photovoltaic power system.

21. An apparatus for carrying out a diagnosis of the normality/abnormality of an output of an installed photovoltaic power system and/or a diagnosis of the cause in the case that the output of said photovoltaic power system is abnormal, comprising:
an input unit for accepting an input of an installation condition of said photovoltaic power system; and that the and
a calculation unit for calculating a reference output characteristic chronologically of said photovoltaic power system itself, in accordance with the installation condition inputted to said input unit;
a measurement unit for measuring an output characteristic chronologically in said photovoltaic power system during operation of the photovoltaic power system itself; and
a comparison unit for comparing the reference output characteristic chronologically calculated by said calculation unit with the measured output characteristic obtained by said measurement unit,
wherein comparisons of the reference output characteristic and the measured output characteristic are performed at different time points of a day,
wherein said photovoltaic power system is diagnosed as normal if the following condition is satisfied, a base value (b) times a correction factor (v) times a lower limit diagnosis factor (r) is less than an actual measured value which is less than the base value (b) times the correction factor (v) times an upper limit diagnosis factor (s).

22. The diagnosis apparatus according to claim 21, further comprising:
a storage unit for storing output the characteristic measured by said measurement unit.

23. The diagnosis apparatus according to claim 21, further comprising:
a solar radiation amount measurement unit for measuring an amount of solar radiation in said photovoltaic power system.

24. An apparatus for carrying out a diagnosis of the normality/abnormality of an output of a photovoltaic power system, comprising:
a storage unit for storing a past measurement result of an output characteristic chronologically of said photovoltaic power system itself; and
a diagnosis unit for diagnosing the normality/abnormality of the output of said photovoltaic power system based on the measurement result of the photovoltaic power system itself stored in said storage unit,
wherein comparisons of the reference output characteristic and the measured output characteristic are performed at different time points of a day, wherein said photovoltaic power system is diagnosed as normal if the following condition is satisfied, a base value (b) times a correction factor (v) times a lower limit diagnosis factor (r) is less than an actual measured value which is less than the base value (b) times the correction factor (v) times an upper limit diagnosis factor (s).

25. The diagnosis apparatus according to claim 24, further comprising:

a determination unit for determining the cause of the abnormality in the case the output of said photovoltaic power system is diagnosed, by said diagnosis unit, as being abnormal.

26. The diagnosis apparatus according to claim 24, further comprising:

a solar radiation amount measurement unit for measuring an amount of solar radiation in said photovoltaic power system.

27. A method for diagnosing the normality/abnormality of an output of an installed photovoltaic power system, comprising the steps of:

comparing a reference output characteristic chronologically obtained in accordance with an installation condition of said photovoltaic power system with a measured output characteristic in said photovoltaic power system obtained during operation of the photovoltaic power system itself; and diagnosing the normality/abnormality of the output of said photovoltaic power system based on the comparison result, wherein said photovoltaic power system is diagnosed as normal only if said measured output characteristic is greater than a first predetermined value and less than a second predetermined value, said first and second predetermined values being based on said reference output characteristic, wherein comparisons of the reference output characteristic and the measured output characteristic are performed at different time points of a day, wherein said photovoltaic power system is diagnosed as normal if the following condition is satisfied, a base value (b) times a correction factor (v) times a lower limit diagnosis factor (r) is less than an actual measured value which is less than the base value (b) times the correction factor (v) times an upper limit diagnosis factor (s).

* * * * *

UNITED STATES PATENT AND TRADEMARK OFFICE
CERTIFICATE OF CORRECTION

PATENT NO.    : 6,892,165 B2
DATED         : May 10, 2005
INVENTOR(S)   : Yagi et al.

It is certified that error appears in the above-identified patent and that said Letters Patent is hereby corrected as shown below:

<u>Title page,</u>
Item [30], Foreign Application Priority Data, change:
"Feb 8, 1991     (JP) ………………….. 2001-032310" to be
-- Feb 8, 2001     (JP) ………………….. 2001-032310 --.

Signed and Sealed this

Thirteenth Day of December, 2005

JON W. DUDAS
*Director of the United States Patent and Trademark Office*